United States Patent
Ramaiah et al.

(10) Patent No.: US 12,072,966 B2
(45) Date of Patent: Aug. 27, 2024

(54) SYSTEM AND METHOD FOR DEVICE AUTHENTICATION USING A BASEBOARD MANAGEMENT CONTROLLER (BMC)

(71) Applicant: Dell Products, L.P., Round Rock, TX (US)

(72) Inventors: Dharma Bhushan Ramaiah, Bengaluru (IN); Chandrashekar Nelogal, Round Rock, TX (US); Chandrasekhar Mugunda, Austin, TX (US); Shinose Abdul Rahiman, Bangalore (IN); Vineeth Radhakrishnan, Bangalore (IN); Rama Rao Bisa, Bangalore (IN); Viswanath Ponnuru, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 466 days.

(21) Appl. No.: 17/381,399

(22) Filed: Jul. 21, 2021

(65) Prior Publication Data
US 2023/0010283 A1    Jan. 12, 2023

(30) Foreign Application Priority Data
Jul. 8, 2021    (IN) .............................. 202111030703

(51) Int. Cl.
| | |
|---|---|
| *G06F 21/44* | (2013.01) |
| *G06F 11/22* | (2006.01) |
| *G06F 13/20* | (2006.01) |
| *G06F 13/40* | (2006.01) |
| *G06F 1/26* | (2006.01) |

(52) U.S. Cl.
CPC .......... *G06F 21/44* (2013.01); *G06F 11/2284* (2013.01); *G06F 13/20* (2013.01); *G06F 13/4081* (2013.01); *G06F 1/26* (2013.01)

(58) Field of Classification Search
CPC ...... G06F 21/44; G06F 11/2284; G06F 13/20; G06F 13/4081; G06F 1/26
See application file for complete search history.

(56) References Cited

U.S. PATENT DOCUMENTS

| | | | | |
|---|---|---|---|---|
| 11,157,356 | B2* | 10/2021 | Olarig | G11C 29/52 |
| 2010/0153615 | A1* | 6/2010 | Baba | G06F 13/4022 710/316 |
| 2011/0258410 | A1* | 10/2011 | Lambert | G06F 21/72 713/170 |
| 2016/0014073 | A1* | 1/2016 | Reddy | H04L 47/822 713/2 |
| 2020/0019708 | A1* | 1/2020 | Puthillathe | H04L 63/10 |
| 2020/0042391 | A1* | 2/2020 | Pepper | G06F 11/1417 |
| 2021/0157760 | A1* | 5/2021 | Kaler | H04L 9/0822 |
| 2021/0349836 | A1* | 11/2021 | Benedict | G06F 12/1433 |

(Continued)

*Primary Examiner* — Michael R Vaughan
(74) *Attorney, Agent, or Firm* — Fogarty LLP

(57) ABSTRACT

An Information Handling System (IHS) includes multiple hardware devices, and a baseboard Management Controller (BMC) in communication with the plurality of hardware devices. The BMC includes executable instructions for causing the one hardware device to be inhibited from functioning with the IHS when at least one of the hardware devices is powered on, and performing an authentication procedure with that hardware device. After that hardware device has been successfully authenticated, the instructions then enable the one hardware device to function with the IHS.

17 Claims, 4 Drawing Sheets

(56) References Cited

U.S. PATENT DOCUMENTS

| | | | |
|---|---|---|---|
| 2022/0124118 A1* | 4/2022 | Bangalore Sathyanarayana | ......... H04L 63/1425 |
| 2023/0009470 A1* | 1/2023 | Ponnuru | ............. H04L 63/1466 |

* cited by examiner

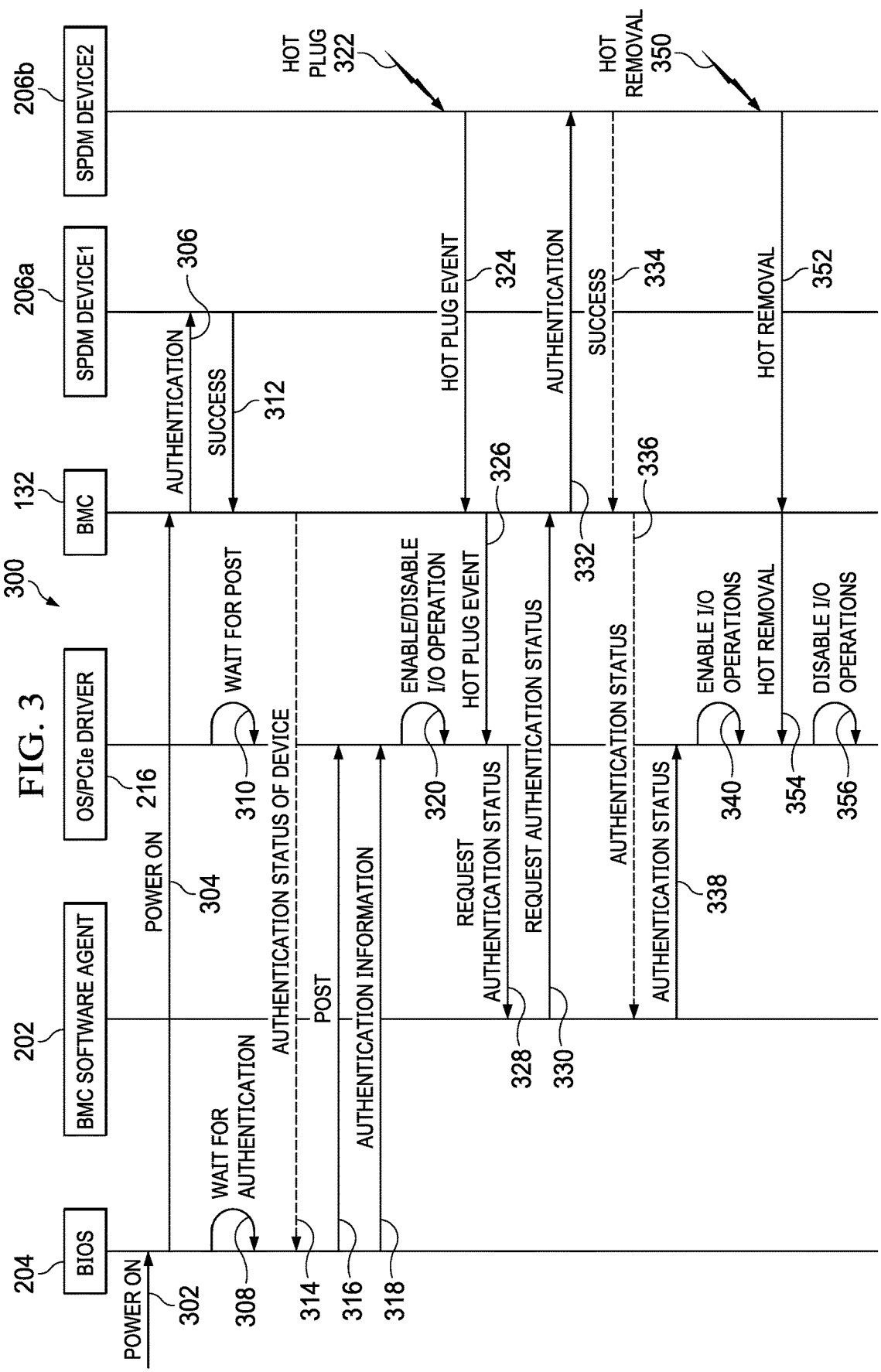

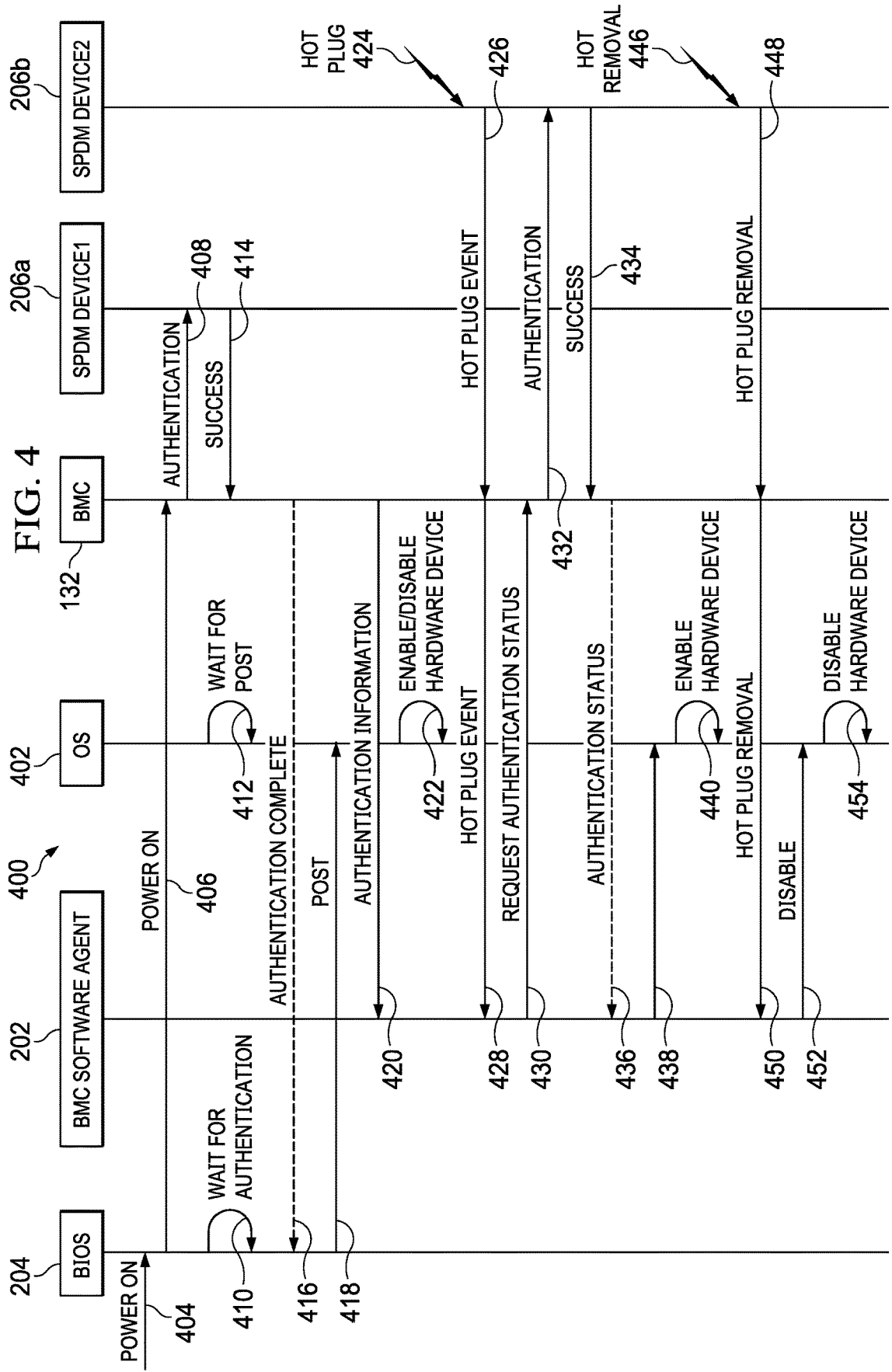

SYSTEM AND METHOD FOR DEVICE AUTHENTICATION USING A BASEBOARD MANAGEMENT CONTROLLER (BMC)

CROSS REFERENCE TO RELATED APPLICATIONS

This patent application claims priority to co-pending, commonly assigned Indian Patent Application No. 202111030703, filed Jul. 8, 2021 and entitled "System and Method for Device Authentication Using a Baseboard Management Controller (BMC);" the entire contents of which are incorporated by reference herein.

FIELD

This disclosure relates generally to Information Handling Systems (IHSs), and more specifically, to a system and method for device authentication using a baseboard management controller (BMC).

BACKGROUND

An Information Handling System (IHS) generally refers to any computing system that processes, compiles, stores, and/or communicates information or data for business, personal, or other purposes. Modern day IHS administrative management is often provided via baseboard management controllers (BMCs). The baseboard management controller (BMC) generally includes a specialized microcontroller embedded in the IHS, and may provide an interface between system-management software and platform hardware. Different types of sensors built into the IHS report to the BMC on parameters such as temperature, cooling fan speeds, power status, operating system (O/S) status, and the like. The BMC monitors the sensors and can send alerts to a system administrator via the network if any of the parameters do not stay within pre-set limits, indicating a potential failure of the system. The administrator can also remotely communicate with the BMC to take certain corrective actions, such as resetting or power cycling the system to get a hung O/S running again. These abilities can often save on the total cost of ownership of an IHS, particularly when implemented in large clusters, such as server farms.

SUMMARY

An information handling system (IHS) includes multiple hardware devices, and a baseboard management controller (BMC) in communication with the plurality of hardware devices. The BMC includes executable instructions for causing the one hardware device to be inhibited from functioning with the IHS when at least one of the hardware devices is powered on, and performing an authentication procedure with that hardware device. After that hardware device has been successfully authenticated, the instructions then enable the one hardware device to function with the IHS.

According to another embodiment, a computer-executable method includes the steps of causing at least one hardware device of an IHS to be inhibited from functioning with the IHS when that hardware device is initially powered on, and performing an authentication procedure with the one hardware device. The method further includes the steps of enabling the hardware device to function with the IHS after the one hardware device has been successfully authenticated.

According to yet another embodiment, a baseboard management controller (BMC), which is in communication with multiple hardware devices of an IHS, includes executable instructions for causing the one hardware device to be inhibited from functioning with the IHS when at least one of the hardware devices is powered on, and performing an authentication procedure with that hardware device. After that hardware device has been successfully authenticated, the BMC then enables the one hardware device to function with the IHS.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

FIG. 3 is a workflow diagram describing certain steps of one embodiment of a hardware device authentication method according to one embodiment of the present disclosure.

FIG. 4 is a workflow diagram describing certain steps of another embodiment of a hardware device authentication method according to one embodiment of the present disclosure.

DETAILED DESCRIPTION

Figure 1:
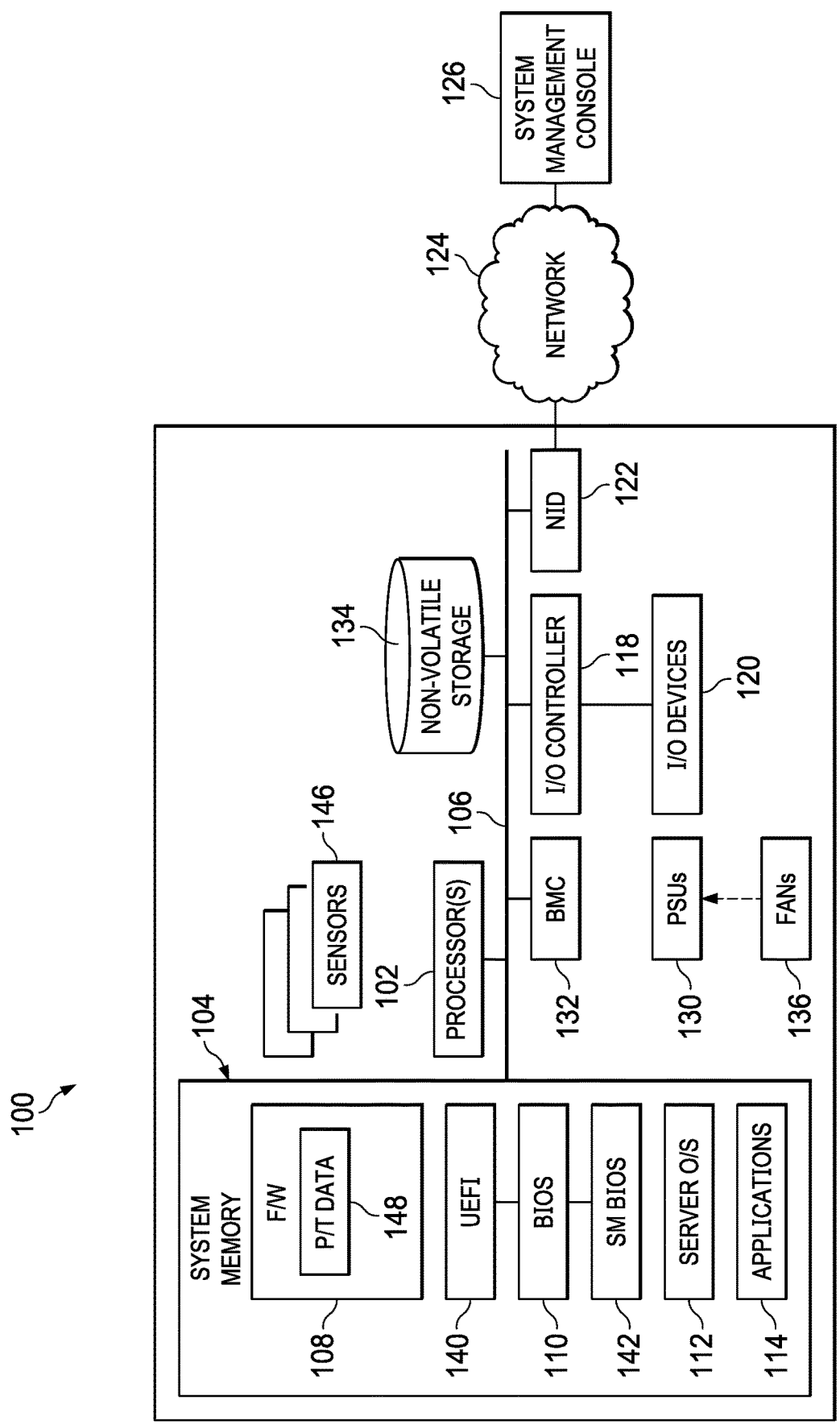
FIG. 1 shows an example of an IHS configured to implement systems and methods for hardware device authentication using a baseboard management controller (BMC).

Embodiments of the present disclosure provide an authentication system and method for hardware devices of an information handling system (IHS) using a baseboard management controller (BMC). It has been learned that some hardware devices, which can be physically added to and removed from IHSs can cause certain security threats if not handled properly. Conventional IHS implementations, however, have yet to be designed to deal with such threats. Embodiments of the present disclosure provide a solution to this problem, among others, using an authentication scheme for safely entering the hardware devices into service for their associated IHSs, while eliminating or reducing any security exposure that could be caused thereby.

Certain IHSs may be configured with BMCs that are used to monitor, and in some cases manage computer hardware components of their respective IHSs. A BMC is normally programmed using a firmware stack that configures the BMC for performing out-of-band (e.g., external to a computer's operating system or BIOS) hardware management tasks. The BMC firmware can support industry-standard Specifications, such as the Intelligent Platform Management Interface (IPMI) and Systems Management Architecture of Server Hardware (SMASH) for computer system administration.

Many IHS designs have been implemented with various types of system buses to enhance their functionality and extensibility. In general, a system bus provides an electrical interconnection scheme for connecting the hardware devices of an IHS, often using one or more expansion slots. The system bus combines the functions of a data bus to convey information, an address bus to determine where it should be sent, and a control bus to determine how the information is handled. Examples of such system buses may include those conforming to a Peripheral Component Interconnect (PCI) standard, a Peripheral Component Interconnect Express PCIe standard, or an accelerated graphics port (AGP) standard. Examples of hardware devices that may use these system buses include graphics processing cards, network interface cards, input/output (I/O) (e.g., USB) expansion port cards, Wi-Fi interface cards, storage controller cards, and the like.

These system buses have provided a relatively efficient technique for modifying or enhancing the functionality of an IHS by enabling the hardware devices to be easily added to, and removed from the IHS. Many of these hardware devices are provided with their own computer executable environment capable of performing certain algorithms. These algorithms, however, may include harmful (either malicious or inadvertent) algorithms that can damage or hinder the operation the IHS if not managed properly.

One solution to this problem would be to ensure that only properly vetted expansion cards are allowed to be used. Thus, it would be beneficial to authenticate each expansion card in the IHS each time it is booted. The BMC, which functions in an out-of-band manner relative to the operation of the IHS would be ideally suited for this purpose. The BMC could be used to authenticate the hardware devices while the IHS's BIOS is performing its power on self-test (POST) procedure. A Security Protocol and Data Model (SPDM) specification has been published, which defines a technique for authenticating hardware devices. In general, the Security Protocol and Data Model (SPDM) Specification defines messages and procedures for communication among devices, and is generally agnostic to the type of communication channel used.

In some cases, however, the authentication process performed by the BMC may require more time than the POST procedure performed by the BIOS, thus yielding a potential security breach where any harmful algorithms running on the hardware device may be able to inflict damage to the IHS. An additional security problem may exist due to the ability of many hardware devices being added to (e.g., hot-plugged) or removed from (i.e., hot-removed) the IHS while it is running. Thus, merely performing hardware device authentication during the boot phase of the IHS's operation may not sufficiently protect the IHS from the damaging effects of harmful code that may exist on the hardware devices. Embodiments of the present disclosure may provide solutions to these problems, among others, using the hardware device authentication system and method as described herein below.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 1 shows an example of an IHS 100 configured to implement systems and methods for hardware device authentication using a baseboard management controller (BMC) 132. Particularly, IHS 100 includes one or more processor(s) 102 coupled to system memory 104 via system bus which may include any suitable type. System memory 104 may include a plurality of software and/or firmware modules including firmware (F/W) 108, basic input/output system (BIOS) 110, operating system (O/S) 112, and/or application(s) 114. Software and/or firmware module(s) stored within system memory 104 may be loaded into processor(s) 102 and executed during operation of IHS 100.

F/W 108 may include a power/thermal profile data table 148 that is used to store power profile data and thermal profile data for certain hardware devices (e.g., processor(s) 102, system memory 104, non-volatile storage 134, NID 122, I/O controllers 118, etc.). System memory 104 may include a UEFI interface 140 and/or a SMBIOS interface 142 for accessing the BIOS as well as updating BIOS 110. In general, UEFI interface 140 provides a software interface between an operating system and BIOS 110. In many cases, UEFI interface 140 can support remote diagnostics and repair of computers, even with no operating system installed. SMBIOS interface 142 can be used to read management information produced by BIOS 110 of a IHS 100. This feature can eliminate the need for the operating system to probe hardware directly to discover what devices are present in the computer.

IHS 100 includes one or more input/output (I/O) controllers 118 which manages the operation of one or more connected input/output (I/O) device(s) 120, such as a keyboard, mouse, touch screen, microphone, a monitor or display device, a camera, a microphone, audio speaker(s) (not shown), an optical reader, a universal serial bus (USB), a card reader, Personal Computer Memory Card International Association (PCMCIA) slot, and/or a high-definition multimedia interface (HDMI), may be included or coupled to IHS 100.

IHS 100 includes Network Interface Device (NID) 122. NID 122 enables IHS 100 to communicate and/or interface with other devices, services, and components that are located externally to IHS 100. These devices, services, and components, such as a system management console 126, can interface with IHS 100 via an external network, such as network 124, which may include a local area network, wide area network, personal area network, the Internet, etc.

IHS 100 further includes one or more power supply units (PSUs) 130. PSUs 130 are coupled to a BMC 132 via an I²C bus. BMC 132 enables remote operation control of PSUs 130 and other components within IHS 100. PSUs 130 power the hardware devices of IHS 100 (e.g., processor(s) 102, system memory 104, non-volatile storage 134, NID 122, I/O controllers 118, PSUs 130, etc.). To assist with maintaining temperatures within specifications, an active cooling system, such as one or more fans 136 may be utilized.

IHS 100 further includes one or more sensors 146. Sensors 146 may, for instance, include a thermal sensor that is in thermal communication with certain hardware devices that generate relatively large amounts of heat, such as processors 102 or PSUs 130. Sensors 146 may also include voltage sensors that communicate signals to BMC 132 associated with, for example, an electrical voltage or current at an input line of PSU 130, and/or an electrical voltage or current at an output line of PSU 130.

BMC 132 may be configured to provide out-of-band management facilities for IHS 100. Management operations may be performed by BMC 132 even if IHS 100 is powered off, or powered down to a standby state. BMC 132 may include a processor, memory, and an out-of-band network interface separate from and physically isolated from an in-band network interface of IHS 100, and/or other embedded resources.

In certain embodiments, BMC 132 may include or may be part of a Remote Access Controller (e.g., a DELL Remote Access Controller (DRAC) or an Integrated DRAC (iDRAC)). In other embodiments, BMC 132 may include or may be an integral part of a Chassis Management Controller (CMC). As a non-limiting example, the BMC 132 may be an integrated Dell Remote Access Controller (iDRAC) from Dell® that is embedded within a Dell PowerEdge™ server to provide functionality that helps information technology (IT) administrators deploy, update, monitor, and maintain servers remotely.

Figure 2:
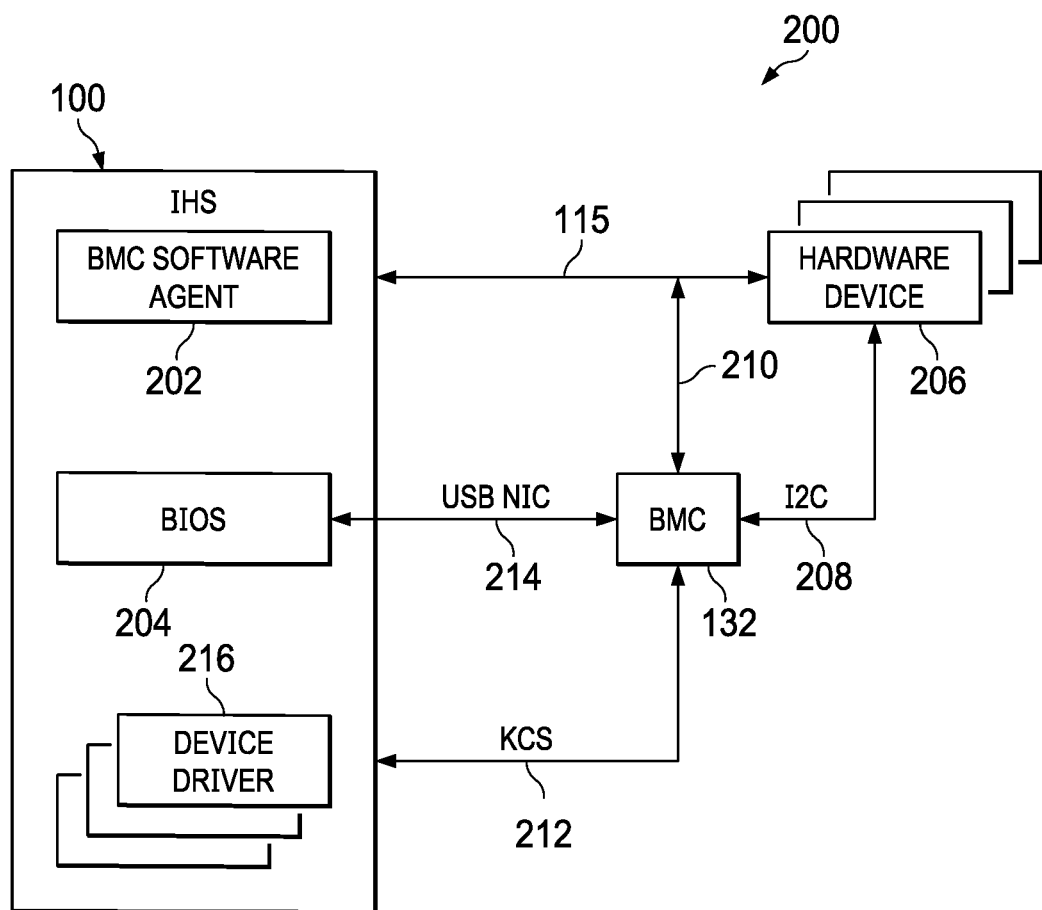
FIG. 2 is a diagram illustrating several components of an example BMC along with those of an associated IHS showing how those components may signal one another for implementing the BMC-based hardware device authentication system according to one embodiment of the present disclosure.

FIG. 2 is a diagram 200 illustrating several components of an example BMC 132 along with those of an associated IHS 100 showing how those components may signal one another for implementing the BMC-based hardware device authentication system according to one embodiment of the present disclosure. The IHS 100 is shown with a BMC software agent 202 and a basic input output system (BIOS) 204, and one or more device drivers 216 that are each associated with one of the hardware devices 206. The IHS 100 also includes one or more hardware devices 206, such as graphics processing cards, network interface cards, input/output (I/O) (e.g., USB) expansion port cards, Wi-Fi interface cards, storage controller cards, and the like. For example, the hardware devices 206 may be an I/O controller 118, a NID 122, or a storage controller configured to manage the non-volatile storage 134, such as described herein above. Each hardware device 206 communicates with the IHS 100 via system bus 106. In one embodiment, system bus 106 may include a Peripheral Component Interconnect Express (PCIe) bus.

According to certain embodiments of the present disclosure, the hardware device 206 may comprise any removable device that communicates using the Security Protocol and Data Model (SPDM) protocol. Within this disclosure, a removable device may be any type that can be added to or removed from the IHS 100. In some cases, the hardware device 206 can be hot-plugged into the IHS 100. That is, the hardware device 206 can be added to, or removed from the IHS 100 while it is running.

The BMC 132 communicates with each of multiple hardware devices 206 via an i2c connection 208 such as described above. In other embodiments, the BMC 132 may communicate with each of the hardware devices 206 using other communication protocol, such as i3c SENSEWIRE connections, or serial peripheral interface (SPI) based connections. Additionally, the BMC 132 may also communicate with each of the hardware devices 206 through the system bus 106 using a Management Component Transport Protocol (MCTP) PCIe vendor defined message (VDM) channel 210.

The BMC 132 may also communicate with the IHS 100 through the PCIe VDM channel 210, a Keyboard Controller Style (KCS) channel 212, and/or a USB NIC channel 214. The KCS channel 212 is provided as part of an intelligent platform management interface (IPMI) specification. In general, the IPMI specification defines several system interfaces for local access from the BMC software agent 202 and BIOS 204 to the BMC 132 of which the KCS protocol provides an ideal connection that does not require authentication for its operation.

The BMC software agent 202 is a lightweight software service that is executed on the host IHS 100 to integrate certain operating system (OS) features with the BMC 132. The BMC software agent 202 provides OS-related information to the BMC 132, and may add capabilities such as LC log event replication into the OS log, WMI support (including storage), iDRAC SNMP alerts via OS, iDRAC hard reset and remote full Power Cycle. For example, the BMC software agent 202 may be an iDRAC Service Module (iSM) that is configured to operate with the integrated Dell remote access controller (iDRAC), which are both provided by the DELL CORPORATION.

As described above, some hardware devices, which can be physically added to and removed from IHSs can cause certain security threats if not handled properly. Many of these hardware devices are provided with their own computer executable environment capable of executing certain algorithms for providing their respective services. These algorithms, however, may include harmful (either malicious or inadvertent) code that can damage or hamper the operation the IHS. The hardware device authentication system uses an authentication scheme for safely entering the hardware devices into service for their IHSs while eliminating or reducing any potential security breaches that could be caused thereby.

During booting of the BMC 132, the hardware devices 206 are authenticated and a secure channel is established. Once authenticated, the hardware devices 206 can be trusted and I/O operations can be performed by the IHS 100. Nevertheless, certain hardware devices 206 may be hot plug capable (e.g., inserted while the IHS is running), thus yielding a security leak in which malicious code running on the hardware device may be able to access the system bus 106. Additionally, OS resource allocation and utilization by certain hardware devices 206 may start earlier then the BMC 132 (e.g., DELL's iDRAC) has a chance to authenticate the device using its sideband interface. As will be described in detail herein below, embodiments of the present disclosure cause the BIOS 204 power on self-test (POST) procedure to wait until some, most, or all hardware devices 206 are authenticated prior to allowing the POST procedure to complete.

Although FIG. 2 describes one example of an architecture that may be configured to provide a hardware device authentication system, the features of the disclosed architecture may be embodied in other specific forms without deviating from the spirit and scope of the present disclosure. For example, the IHS/BMC architecture as shown may include additional, fewer, or different components than those operations as described in the present example. As another example, while the IHS 100 is shown with those components described above for purposes of brevity and clarity of discussion, it should be appreciated that IHS 100 may be configured with additional, fewer, or different components without departing from the spirit and scope of the present disclosure.

FIG. 3 is a workflow diagram describing certain steps of one embodiment of a hardware device authentication method 300 according to one embodiment of the present disclosure. As will be described in detail herein below, the method 300 may be provided for authenticating hardware devices 206 prior to allowing them to access the processes (e.g., I/O operations) of the host IHS 100. Initially, the IHS 100 is configured with a BMC 132 and a hardware device 206a that is capable of communicating using the SPDM protocol. Although only two hardware devices 206a, 206b are shown and described in the method 300, it should be understood that the method 300 can be practiced with any quantity of hardware devices 206, such as three or more SPDM enabled hardware devices 206.

At step 302, the IHS 100 is powered on. The IHS 100 may be powered on manually by a user, or remotely, such as a remote command received through the BMC 132. At step 304, the BIOS 204 issues a power ON signal to the BMC 132, which in turn, causes the BMC 132 to commence its authentication procedure with each of the hardware devices 206a in the IHS 100 at step 306.

Immediately after sending the power ON signal to the BMC 132, the BIOS 204 waits for authentication by the BMC 132 for each hardware device 206a at step 308. That is, the BIOS 204 may concurrently perform its POST in the normal manner, but is not allowed to issue the POST complete message until it receives an authentication complete message from the BMC 132. Additionally, the device driver 216 associated with the hardware device 206a waits for the POST complete message prior to commencing its operation at step 310.

At some point in time when the authentication procedure started for the hardware device 206a at step 306 is completed, the hardware device 206a issues a success message to the BMC 132 at step 312. For example, the success message issued by the hardware device 206a may include a response message to a challenge message included in the message at step 306. In one embodiment, the authentication procedure may be conducted according to the SPDM protocol. Additionally, although the method 300 only describes the authentication of one hardware device 206a, it should be appreciated that the authentication procedure may be performed for each of multiple hardware devices 206a configured in the IHS 100.

At step 312, after the BMC 132 has performed the authentication procedure for the hardware device 206a, it transmits the authentication status of the hardware device 206a to the BIOS 204 at step 314. Thereafter at steps 316 and 318, the BIOS 204 issues the POST complete message to the device driver 216 along with its associated hardware device 206a authentication status, respectively. In response, the device driver 216 either inhibits or allows operation of its respective hardware device 204 based upon the authentication status at step 320. That is, if a particular device driver 216 receives a successful authentication status, it would then enable its associated hardware device 206a for operation with the IHS 100. On the other hand, if a particular device driver 216 receives a failed authentication status, it would then inhibit its associated hardware device 206a from operation with the IHS 100. In one embodiment, the BIOS 204 and/or other entity, such as the system bus controller may inhibit operation of any unused slots. This action may be particularly useful in cases where a hardware device 206a is hot-plugged into the unused slot in which operation of the hot-plugged hardware device 206a may be authenticated prior to being allowed to access the services of the host IHS 100. Such may be the case as described below with reference to steps 322 through 340.

At step 322, another hardware device 206b is hot-plugged into a slot of the IHS 100. While the hardware device 206b is being described herein as being hot-plugged into a slot, it should be understood that the device may be any mechanism or connector that allows the hardware device 206b to be interconnected to the IHS 100. Furthermore, it is contemplated that, rather than a slot, the hardware device 206b may be interconnected to the IHS 100 using a wireless connection, such as Bluetooth connection, that interconnects a SPDM capable hardware device 206b to the IHS 100. The BMC 132 is then notified of the hot-plug event at step 324, and forwards the notification to the device driver 216 associated with that hardware device 206b at step 326. At step 328, the device driver 216 then sends an authentication status request to the BMC software agent 202, which in turn, forwards the authentication request to the BMC 132 at step 330.

At step 332, the BMC 132 commences its authentication procedure with the hardware device 206b. At some point in time when the authentication procedure is completed, the hardware device 206b issues a success message to the BMC 132 at step 334. The success message may be, for example, a successful response message to a previous challenge message presented by the BMC 132 at step 332. Thereafter, the BMC 132 sends the authentication status to the BMC software agent 202 at step 336, which in turn, forwards the authentication status to the device driver 216 associated with that hardware device 206b at step 338. In response, the device driver 216 either inhibits or allows operation of its respective hardware device 206b based upon the authentication status at step 340. That is, if a particular device driver 216 receives a successful authentication status, it would then enable its associated hardware device 206a for operation with the IHS 100; otherwise, it inhibits its associated hardware device 206b from operation with the IHS 100.

Steps 350 through 356, generally describe a sequence of actions that may be performed to disable operation of a slot or other interconnection mechanism when the hardware device 206b is hot removed from the IHS 100. Within this disclosure, hot removal generally refers to the act of removing the hardware device 206b while the IHS 100 is currently running. At step 350, the hardware device 206b is hot removed from the IHS 100. The BMC 132 is notified of this event at step 352, and in turn, sends a hot removal message to the device driver 216 associated with the hardware device 206b at step 354. Throughout this disclosure, the terms 'signal' and 'message' may be used interchangeably to mean any informational technique that is transmitted from one component of the system to another. When the device driver 216 receives the hot removal message, it disables operation of the slot at step 356.

As can be clearly seen from the description above, the BIOS POST procedure waits for the authentication complete message from the BMC 132. Additionally, the BMC 132 authenticates some, most, or all the SPDM capable hardware devices 206 and passes the authentication information to the BIOS 204 via IPMI command over a suitable interface, such as a KCS interface or a memory block shared between the BMC 132 and BIOS 204. The authentication status is then made available to the device driver 216. The device driver 216 can then enable and/or disable the I/O operations for the particular slot. When the hardware device 206 is hot plugged, the device driver 216 can request the authentication status from BMC software agent 202. The BMC software agent 202 may in turn, request the authentication status from the BMC 132. Once the authentication credentials are verified successfully, the BMC software agent 202 may then pass the information to the device driver 216. The device driver 216 may then enable or disable the functionality (e.g., I/O operations) of the hardware device 206 based on the authentication status. When the hardware device 206 is removed, the device driver 216 shall disable the I/O operation for the particular slot. Nevertheless, when use of the workspace migration method 300 is no longer needed or desired, the process ends.

Although FIG. 3 describes an example method that may be performed for managing event messages, the features of the method 300 may be embodied in other specific forms without deviating from the spirit and scope of the present disclosure. For example, the method 300 may perform additional, fewer, or different operations than those described in the present examples. As another example, certain steps of the method 300 may be performed by other components in the IHS 100 other than those described above.

FIG. 4 is a workflow diagram describing certain steps of another embodiment of a hardware device authentication method 400 according to one embodiment of the present disclosure. As will be described in detail herein below, the method 400 may be provided for authenticating hardware devices 206 prior to allowing them to function, such as performing I/O operations with the host IHS 100. Initially, the IHS 100 is configured with a BMC 132 and a hardware device 206a that is capable of communicating using the SPDM protocol. Although only two hardware devices 206a, 206b are shown and described in the method 400, it should be understood that the method 400 can be practiced with any quantity of hardware devices 206, such as three or more SPDM enabled hardware devices 206.

At step 404, the IHS 100 is powered on. The IHS 100 may be powered on manually by a user, or remotely, such as a remote command received through the BMC 132. At step 406, the BIOS 204 issues a power ON signal to the BMC 132, which in turn, causes the BMC 132 to commence its authentication procedure with the hardware device 206a in the IHS 100 at step 408.

Immediately after sending the power ON signal to the BMC 132, the BIOS 204 waits for authentication by the BMC 132 for the hardware device 206a at step 410. In other embodiments in which the IHS 100 includes multiple hardware devices, the BIOS 204 may wait until the authentication for all of the hardware devices are complete. That is, the BIOS 204 may concurrently perform its POST in the normal manner, but is not allowed to issue the POST complete message until it receives an authentication complete message from the BMC 132. Additionally, the operating system 402 of the IHS 100 waits for the POST complete message prior to commencing its operation at step 412.

At some point in time when the authentication procedure started for the hardware device 206a at step 408 is completed, the hardware device 206a issues a success message to the BMC 132 at step 414. For example, the success message issued by the hardware device 206a may include a response message to a challenge message included in the message at step 408. In one embodiment, the authentication procedure may be conducted according to the SPDM protocol.

Although the method 400 only describes the authentication of one hardware device 206a, it should be appreciated that the authentication procedure may be performed for each of multiple hardware devices 206a configured in the IHS 100. Additionally in certain embodiments, a subset of all the SPDM capable hardware devices 206a may be designated to perform an authentication procedure with the BMC 132. For example, the BIOS 204 may store information for enforcing the authentication procedure for those hardware devices 206a that are provided by a certain vendor. As another example, the BIOS 204 may store information for not requiring certain hardware devices 206a to undergo the authentication procedure, such as those hardware devices 206 having a level of trust such that authentication is not warranted. As yet another example, the BIOS 204 may store information about those hardware devices 206 that have recently been upgraded with new firmware, and enforce the authentication procedure for only those hardware devices 206 that have recently been upgraded.

At step 414, after the BMC 132 has performed the authentication procedure for the hardware device 206a in the IHS 100, it transmits the authentication status of the hardware device 206a to the BIOS 204 at step 416. Thereafter at steps 418, the BIOS 204 issues the POST complete message to the operating system 402 along with its associated hardware device 206a authentication status. In response, the operating system 402 either inhibits or allows operation of its respective hardware device 206a based upon the authentication status at step 422. That is, if a particular operating system 402 receives a successful authentication status, it would then enable its associated hardware device 206a for operation with the IHS 100. On the other hand, if the operating system 402 receives a failed authentication status, it would then inhibit its associated hardware device 206a from operation with the IHS 100.

Additionally, the BMC 132 sends the authentication status information to the BMC software agent 202 at step 420. This action may be particularly useful in cases where a hardware device 206a is hot-plugged into the unused slot in which operation of the hot-plugged hardware device 206a may be authenticated by the BMC software agent 202, thus alleviating any intervention that would otherwise be required by the BIOS 204 and/or operating system 402. Such may be the case as described below with reference to steps 424 through 440.

At step 424, another hardware device 206b is hot-plugged into a slot of the IHS 100. The BMC 132 is then notified of the hot-plug event at step 426, and forwards the notification to the BMC software agent 202 at step 428. At step 430, the BMC software agent 202 then sends an authentication status request to the BMC 132, which in turn, commences an authentication procedure with the newly connected hardware device 206b at step 432. At some point in time when the authentication procedure is completed, the hardware device 206b issues a success message to the BMC 132 at step 434. The success message may be, for example, a successful response message to a previous challenge message presented by the BMC 132 at step 432.

Thereafter, the BMC 132 sends the authentication status to the BMC software agent 202 at step 436, which in turn, forwards the authentication status to the operating system 402 at step 438. In response, the operating system 402 either inhibits or allows operation of the hardware device 206b based upon the authentication status at step 440. That is, if the operating system 402 receives a successful authentication status, it would then enable its associated hardware device 206b for operation with the IHS 100; otherwise, it inhibits the hardware device 206b from operation with the IHS 100.

Steps 446 through 454, generally describe a sequence of actions that may be performed to disable operation of a slot or other interconnection mechanism when the hardware device 206b is hot removed from the IHS 100. At step 446, the hardware device 206b is hot removed from the IHS 100. The BMC 132 is notified of this event at step 448, and in turn, sends a hot removal message to the BMC software agent 202 at step 450. Thereafter at step 452, the BMC software agent 202 notifies the operating system 402 of the hot removal action, such that the operating system 402 can disable the slot at step 454.

As can be clearly seen from the description above, the BIOS POST procedure waits for the authentication complete message from the BMC 132. Additionally, the BMC 132 authenticates some, most, or all the SPDM capable hardware devices 206 and informs the BIOS 204, which waits until it receives the message to issue a POST complete message to the IHS 100. Upon POST complete, the BMC 132 passes the authentication information to BMC software agent 202. Based on the authentication status, the BMC software agent 202 disables the device driver 216 for the slot of any un-authenticated hardware device 206 in addition to any empty slots. Additionally, the BMC software agent 202 may receive hot plug events from BMC 132, and it may disable/enable the driver for the slot based on the SPDM authentication status received from BMC 132. The BMC software agent 202 may disable the device driver 216 for the slot upon receiving hot removal notification from the BMC 132. Additionally, the BMC software agent 202 may shall enable/disable the slots if the host operating system 402 supports such functionality. Nevertheless, when use of the workspace migration method 400 is no longer needed or desired, the process ends.

Although FIG. 4 describes an example method that may be performed for managing event messages, the features of the method 400 may be embodied in other specific forms without deviating from the spirit and scope of the present disclosure. For example, the method 400 may perform additional, fewer, or different operations than those described in the present examples. As another example, certain steps of the method 400 may be performed by other components in the IHS 100 other than those described above.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a plurality of hardware devices; and
a Baseboard Management Controller (BMC) in communication with the plurality of hardware devices, the BMC comprising at least one memory having instructions stored thereon that, upon execution by at least one processor, cause the BMC to:
when one of the hardware devices is powered on, cause the one hardware device to be inhibited from functioning with the IHS;
perform an authentication procedure with the one hardware device;
after the one hardware device has been successfully authenticated, enable the one hardware device to function with the IHS; and
after the one hardware device has been unsuccessfully authenticated, inhibit the one hardware device from functioning with the IHS by communicating with a BMC software agent to disable a driver of the one hardware device from functioning on the IHS.

2. The IHS of claim 1, wherein the instructions further cause the BMC to power on the one hardware device due to power being applied to the IHS.

3. The IHS of claim 1, wherein the instructions further cause the BMC to power on the one hardware device due to being hot-plugged onto the IHS.

4. The IHS of claim 1, wherein the IHS comprises a basic input output system (BIOS) configured to perform a power on self-test (POST) procedure, and wherein the instructions further cause the BMC to:
communicate with the bios of the IHS to delay completion of the POST until the one hardware device has been authenticated.

5. The IHS of claim 4, wherein the IHS comprises a bus controller configured to control operations of a bus that communicatively couples the IHS to the one hardware device, and wherein the instructions further cause the BMC to cause the one hardware device to be inhibited from functioning with the IHS by communicating with the bus controller to disable the one hardware device from communicating through the bus.

6. The IHS of claim 5, wherein the bus comprises a plurality of slots configured for coupling the one hardware device to the IHS, and wherein the instructions further cause the BMC to disable any empty slots of the bus.

7. The IHS of claim 4, wherein the instructions further cause the BMC to perform the authentication procedure using a SPDM protocol.

8. A method comprising:
when one of a plurality of hardware devices of an information handling system (IHS) is powered on, causing, using instructions stored in at least one memory and executed by at least one processor, the one hardware device to be inhibited from functioning with the IHS;
performing, using the instructions, an authentication procedure with the one hardware device;
after the one hardware device has been successfully authenticated, enabling, using the instructions, the one hardware device to function with the IHS; and
after the one hardware device has been unsuccessfully authenticated, inhibiting, using the instructions, the one hardware device from functioning with the IHS by communicating with a BMC software agent to disable a driver of the one hardware device from functioning on the IHS.

9. The method of claim 8, further comprising powering on the one hardware device by applying power to the IHS.

10. The method of claim 8, further comprising powering on the one hardware device by hot-plugging the one hardware device onto the IHS.

11. The method of claim 8, further comprising:
performing a power on self-test (POST) procedure; and
communicating with the bios of the IHS to delay completion of the post until the one hardware device has been authenticated.

12. The method of claim 11, further comprising causing the one hardware device to be inhibited from functioning with the IHS by communicating with the bus controller to disable the one hardware device from communicating through the bus.

13. The method of claim 12, further comprising disabling any empty slots of the bus.

14. The method of claim 11, wherein the instructions perform the authentication procedure using a SPDM protocol.

15. A Baseboard Management Controller (BMC) comprising at least one memory having instructions stored thereon that, upon execution by at least one processor, cause the BMC to:
when one of a plurality of hardware devices of an information handling system (IHS) is powered on, cause the one hardware device to be inhibited from functioning with the IHS;
perform an authentication procedure with the one hardware device;
after the one hardware device has been successfully authenticated, enable the one hardware device to function with the IHS; and
after the one hardware device has been unsuccessfully authenticated, inhibit the one hardware device from functioning with the IHS by communicating with a BMC software agent to disable a driver of the one hardware device from functioning on the IHS.

16. The BMC of claim 15, wherein the IHS comprises a bios configured to perform a power on self-test (POST) procedure, and wherein the instructions further cause the BMC to:
communicate with the bios of the IHS to delay completion of the post until the one hardware device has been authenticated.

17. The BMC of claim 16, wherein the IHS comprises a bus controller configured to control operations of a bus that communicatively couples the IHS to the one hardware device, and wherein the instructions further cause the BMC to:
cause the one hardware device to be inhibited from functioning with the IHS by communicating with the bus controller to disable the one hardware device from communicating through the bus; and
disable any empty slots of the bus.

* * * * *